United States Patent [19]
Schilling

[11] Patent Number: 5,490,764
[45] Date of Patent: Feb. 13, 1996

[54] UNSHROUDED BLADING FOR HIGH BYPASS TURBOFAN ENGINES

[75] Inventor: Jan C. Schilling, Middletown, Ohio

[73] Assignee: General Electric Company, Cincinnati, Ohio

[21] Appl. No.: 257,602

[22] Filed: May 23, 1994

[51] Int. Cl.⁶ ................................................ F01D 5/16
[52] U.S. Cl. ................. 416/239; 416/241 R; 416/241 B
[58] Field of Search ........................ 416/219 R, 229 A, 416/230, 232, 239, 241 R, 241 B, 500

[56] References Cited

U.S. PATENT DOCUMENTS

| | | | |
|---|---|---|---|
| 2,643,853 | 6/1953 | Redding | 416/500 |
| 3,301,530 | 1/1967 | Lull | 416/241 R |
| 3,303,889 | 2/1967 | Bates | 416/239 |
| 3,357,850 | 12/1967 | Baker | 416/500 |
| 3,368,795 | 2/1968 | Bolin et al. | 416/500 |
| 3,758,233 | 9/1973 | Cross et al. | 416/241 R |
| 3,942,231 | 3/1976 | Whitaker. | |
| 4,178,667 | 12/1979 | Stevens et al.. | |
| 4,784,575 | 11/1988 | Nelson et al.. | |
| 4,921,405 | 5/1990 | Wilson | 416/241 R |

FOREIGN PATENT DOCUMENTS

| | | | |
|---|---|---|---|
| 2443591 | 8/1980 | France | 416/230 |
| 143105 | 9/1982 | Japan | 416/219 R |
| 10200 | 1/1983 | Japan | 416/241 R |
| 53003 | 3/1989 | Japan | 416/230 |

*Primary Examiner*—Edward K. Look
*Assistant Examiner*—James A. Larson
*Attorney, Agent, or Firm*—Andrew C. Hess; David L. Narciso

[57] ABSTRACT

Metal alloy fan blades reinforced with a metal matrix composite for enhancing stiffness of the fan blades without a significant weight penalty, and which are suitable for use in high bypass turbofan engines. The metal matrix composite is bonded to each fan blade near its root so as to increase stiffness and thereby provide frequency and stability control to the fan blades. As a result, a lower engine weight can be realized by using more fan blades without the need for a part span shroud.

19 Claims, 2 Drawing Sheets

UNSHROUDED BLADING FOR HIGH BYPASS TURBOFAN ENGINES

The present invention relates to a means for providing frequency and stability control of fan blades used in high bypass turbofan engines. More particularly, this invention relates to the use of a metal matrix composite material at the root of such fan blades in a manner that promotes blade stiffness without incurring significant additional weight, so as to permit higher numbers of fan blades without the need for conventional part span shrouds.

BACKGROUND OF THE INVENTION

High bypass turbofan engines are widely used for high performance aircraft which operate at subsonic speeds. Large fans for high bypass turbofan engines are typically placed at the front of the engine, and serve to produce greater thrust and reduce specific fuel consumption.

It is known in the art that a high number of fan blades in such engines is advantageous in that it reduces the overall system weight of the engine. With higher blade counts, the blade width, or chord, must be reduced to accommodate more blades. To maintain the airfoil contour, the thickness of each blade must also be reduced, resulting in a significantly lighter blade. Fan design criteria is such that the total weight of the blades will decrease with greater numbers of lighter blades.

Due to having thinner blades, high bypass turbofan engines having high blade counts, e.g., in excess of about 28 blades, must incorporate part span shrouds which provide added stiffness for frequency and stability control. The shroud serves to increase the natural frequencies of the blades, while also promoting blade stability control to counteract a self-excited vibrational instability termed "flutter". Without shrouding, the number of fan blades must be reduced to allow wider and thicker, and thus stiffer blades, so as to keep their natural frequencies in flexure between the prime excitation frequencies of the engine.

For a fixed root blade configuration (i.e., the blade is dove-tailed into the hub), a typical shrouded fan rotor has about 32 to 38 blades, while a typical unshrouded fan rotor is limited to about 22 to 26 blades. For blade counts of 28 to 30, a pinned root blade configuration (i.e., each blade pivots about an axis which is parallel to the engine's axis) generally is able to provide frequency control without the requirement for a shroud. However, a pinned root blade configuration demands a higher radius ratio, i.e., the radius of the hub to the radius of the blade tips, requiring a larger fan diameter to produce a given thrust. As with lower blade counts, a larger fan diameter incurs additional and undesirable weight.

A disadvantage with the use of shrouds is that shrouds tend to reduce engine performance by interfering, to some degree, with air flow through the fan. This effect is more pronounced in engines having high tip speeds of about 1350 to about 1600 feet per second. Consequently, low blade counts are typically required for such engines. To offset the weight penalty incurred by the low blade count, these engines generally require hollow fan blades made from materials such as titanium alloys. However, the weight savings derived from the use of hollow blades is diminished in smaller engines, since the smaller blades permit proportionally smaller hollowed regions within the blade. In addition, hollow blades are more expensive to manufacture than solid blades.

In very high bypass fans, composite fan blades formed from such composite materials as graphite epoxy are used to offset weight increases with lower blade counts. However, composite blades are brittle in comparison to titanium blades, and will necessitate thicker blades for small engines to withstand equivalent impacts. In addition, composite blades typically must also be thicker for increased fan tip speeds. Though additional weight is incurred by these requirements, composite blades are still generally lighter than hollow titanium blades for very high bypass engine applications.

From the above, it can be seen that, in terms of maintaining blade frequency and stability control, a conflict exists between engine performance and blade weight. Specifically, lower blade weight is achieved by higher blade counts, which necessitate a shroud to maintain blade frequency and stability. Furthermore, smaller engines that are limited to low blade counts will be proportionally heavier due either to the use of small hollow blades, which are less effective in reducing weight, or to the use of thicker composite blades. Therefore, in terms of minimizing weight, hollow blades do not provide a completely satisfactory solution for smaller engines, nor do composite blades for high tip speed bypass engines.

Accordingly, it would be advantageous to provide a means for increasing blade counts in high bypass turbofan engines, while providing frequency and stability control of the fan blades without the requirement for conventional part span shrouds. In addition, it would be preferable if such a means could offer an alternative to hollow blades on smaller engines, as well as composite blades for high tip speed bypass engine applications, without incurring significant additional weight. Further, it would be advantageous if such a means were sufficiently rugged and cost competitive with current technology blades.

SUMMARY OF THE INVENTION

It is therefore an object of this invention to provide a means for providing frequency and stability control of metal alloy fan blades used in high bypass turbofan engines.

It is a further object of this invention that such a means permit higher numbers of either hollow or solid fan blades without the need for conventional part span shrouds.

It is yet another object of this invention that such a means entail the use of a reinforcing material at the root of the fan blades in a manner that promotes blade stiffness without incurring significant additional weight.

In accordance with a preferred embodiment of this invention, these and other objects and advantages are accomplished as follows.

According to the present invention, there is provided a means for providing frequency and stability control of titanium fan blades used in a high bypass turbofan engine, such that blade stiffness is improved so as to permit high blade counts without the requirement for a part span shroud. In accordance with this invention, a reinforcing material is applied to the blade root of the fan blade adjacent to the fan hub. The reinforcing material is provided in a quantity and thickness which will sufficiently stiffen the fan blade so as to result in blade flexural frequencies which are between the engine's prime excitation frequencies, thereby providing blade frequency and stability control. The stiffness imparted by the reinforcing material in the prescribed region of the fan blade makes unnecessary the use of a part span shroud, as is conventionally required in fan assemblies with high blade counts in excess of about 28 fan blades.

Most preferably, the reinforcing material is a metal matrix composite material having a high elastic modulus, such as titanium-silicon carbide matrix composites. Such materials are metallurgically compatible with the titanium alloy blade materials which are typically used in the industry to form fan blades. Due to the relatively brittle nature of reinforcing materials such as metal matrix composites, the use of the reinforcing material is preferably limited to regions of the fan blade which do not require resistance to foreign object damage from small and medium-sized birds. More specifically, the reinforcing material is preferably limited to the surfaces of a fan blade adjacent its blade root, such that stiffness is imparted to the fan blade in an efficient manner in a region of the blade which is remote from regions of the blade which require resistance to foreign object damage.

The fan blades are preferably formed from a titanium alloy, though it is foreseeable that other suitable metals can be used as long as the fan blades and the reinforcing material are metallurgically compatible. In addition, the fan blades can be hollow or solid, depending upon the particular application.

An advantage of the present invention is that high blade counts of greater than about 28 can be attained without the requirement for a part span shroud. As a result of the higher blade count, an overall weight savings can be realized. Further, the limited use of the reinforcing material in the region of the blade root incurs little additional weight, so as to offer an alternative to hollow and composite fan blades which are typically used in engines that do not readily accommodate a part span shroud.

Other advantages of this invention include the ability of the preferred metal matrix composite to permit the use of titanium alloys for the fan blade material, and the cost competitiveness of the present invention as compared to current fan blade technologies.

Other objects and advantages of this invention will be better appreciated from the following detailed description.

DETAILED DESCRIPTION OF THE INVENTION

The present invention provides improved fan blades for high bypass turbofan engines, wherein the fan blades are reinforced with a metal matrix composite which provides stiffness to the fan blades without a significant weight penalty. The use of the metal matrix composite is preferably limited to regions of a fan blade near its blade root, so as to provide blade flexural frequencies which are between the engine's prime excitation frequencies, and thereby promote blade frequency and stability control. As a result, lower engine weights can be realized by using more fan blades for a particular engine application. Furthermore, the use of the metal matrix composite eliminates the need for part span shrouds, which are conventionally required to provide blade frequency and stability control in engines with high blade counts.

Figure 1:
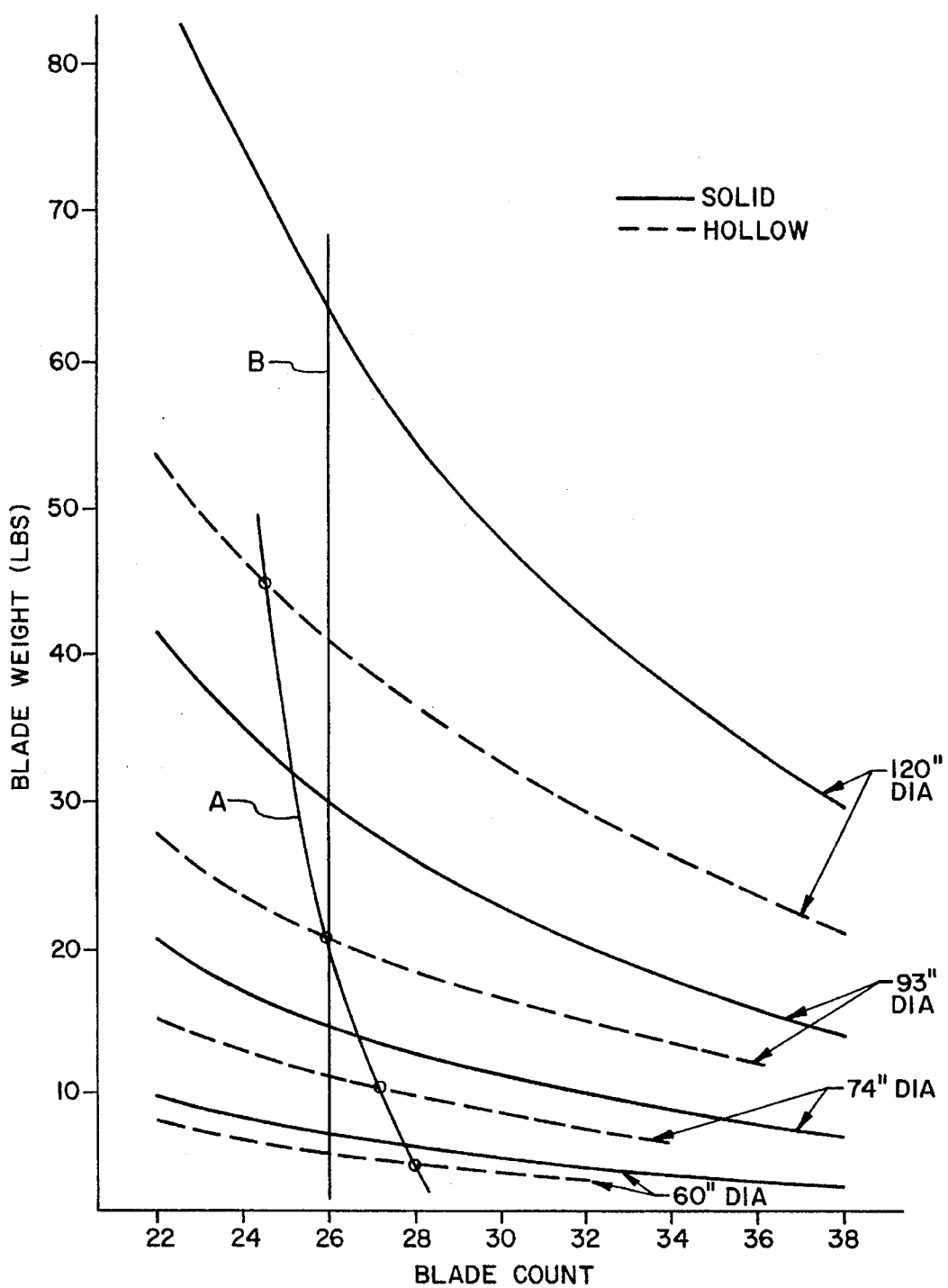
FIG. 1 is a graphical presentation showing the relationship between fan blade weight and blade count for representative high bypass turbofan engines having various fan blade diameters.

FIG. 1 illustrates the general constraints which determine the number of titanium fan blades required for turbofan engines ranging in size from about 60 inches in diameter to about 120 inches in diameter. Line A indicates the minimum number of hollow titanium fan blades which would equate to a shrouded solid blade weight for engine blade-out certification. For example, a 60 inch diameter fan would require a minimum of about 28 blades to be at the weight equivalency of a typical shrouded solid blade, while a 120 inch fan would require a minimum of 24 fan blades. To allow fewer fan blades would require significant structural changes, which would incur additional weight. As would be expected, a significant weight advantage can be realized with the use of hollow fan blades on larger engines, yet weight savings are drastically less when using hollow fan blades on smaller engines. Line B indicates the maximum number of fan blades (roughly 26) which can be employed without the use of a part span shroud.

From the above graph, it can be seen that many blade count/engine combinations conventionally require the use of a part span shroud to induce enough blade stiffness to provide frequency and stability control to titanium fan blades. As also seen by the graph, higher fan blade counts are preferred for reducing the overall blade weight and, in turn, system weight of the engine.

Figure 2:
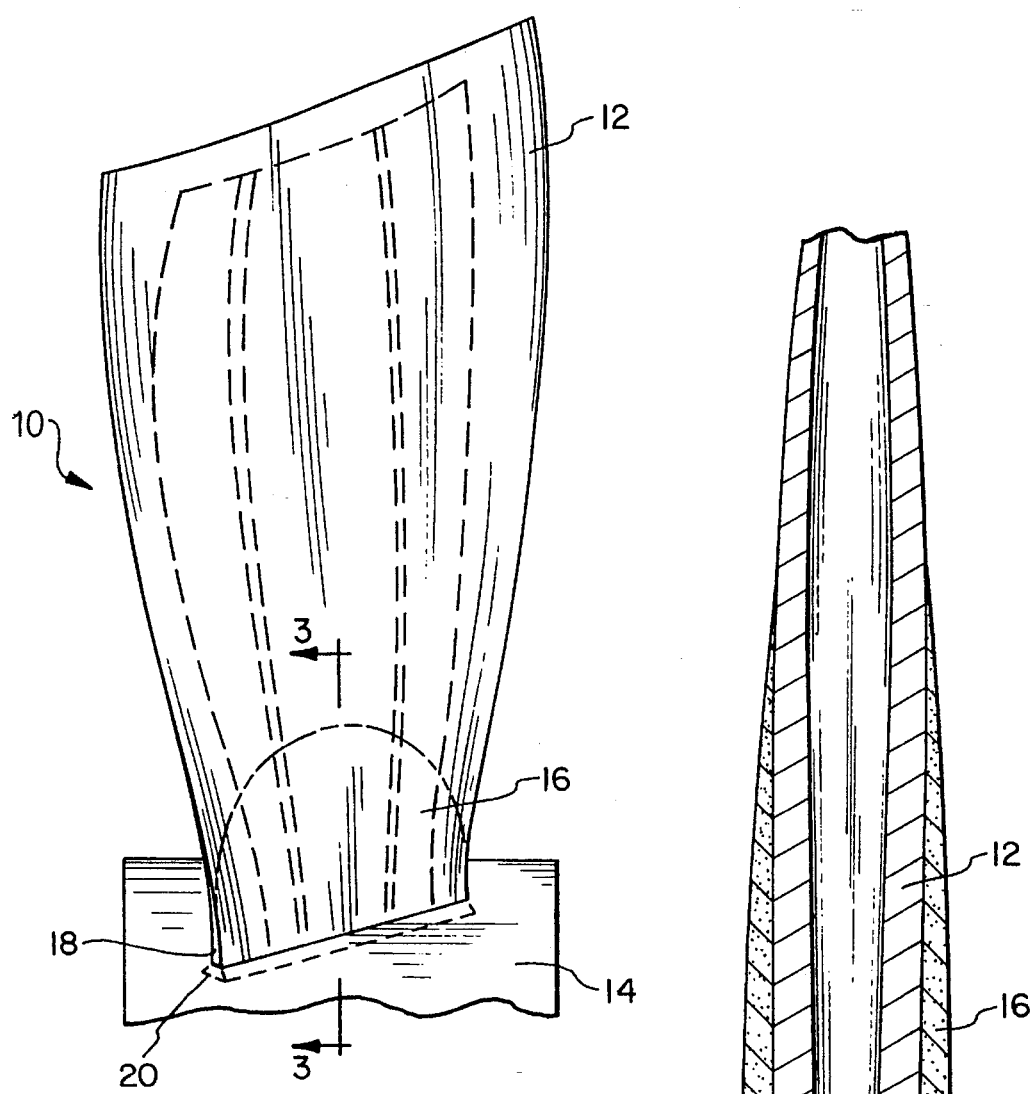
FIG. 2 is a side view of a fan blade mounted to a fan blade hub, wherein the fan blade incorporates a metal matrix composite material adjacent the blade root of the fan blade in accordance with a preferred embodiment of this invention.
Figure 3:
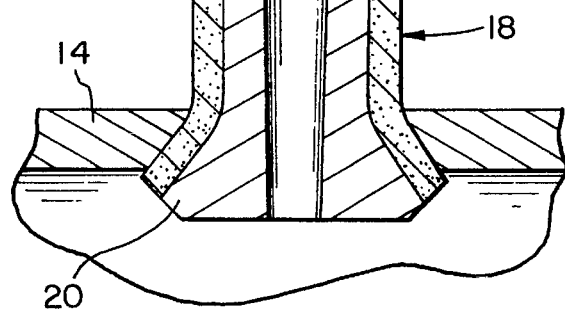
FIG. 3 is a cross-sectional view along line 3—3 of the fan blade of FIG. 2.

With reference to FIGS. 2 and 3, a fan blade 12 in accordance with this invention is shown attached to a hub 14 to form an assembly 10. The fan blade 12 is shown as a fixed root fan blade 12, and is attached to the hub 14 by a dovetail 20 formed near the blade root 18 of the fan blade 12. The fan blade 12 can be either hollow or solid, depending on the particular requirements of an engine application. FIGS. 2 and 3 also indicate the regions of the fan blade 12 which would preferably receive a predetermined amount of a metal matrix composite 16. The metal matrix composite 16 can be deposited on the fan blade 12 by employing bonding technologies well known to those skilled in the art, such as diffusion bonding, as well as others.

The preferred fan blade material for practicing this invention is a high strength titanium alloy, such as Ti-6A1-4V. Titanium alloys of this type are well known in the art, and are often preferred for their tensile strength, fracture toughness, etc., at the elevated temperatures seen by bypass fan blades during engine operation. However, it is foreseeable that other titanium alloy and metal alloy materials could be used.

The preferred metal matrix composite 16 of this invention is preferably a high elastic modulus matrix composite. While metal matrix composites fan blades have previously been proposed, such blades are generally too brittle for practical use. However, the use of a metal matrix composite to reinforce a conventional metal alloy blade near its root has not been previously suggested. To be acceptable for such purposes, the metal matrix composite 16 of this invention must be metallurgically compatible with the fan blade material. Accordingly, for fan blades 12 made from the preferred titanium alloys, the metal matrix composite 16 is preferably a titanium-base metal matrix composite, such as titanium-silicon carbide (SiC/Ti) metal matrix composites. The preferred titanium-base metal matrix composites combine the attributes of the base titanium material with those of the silicon carbide fiber phase, so as to produce properties including low density with increased high temperature strength and stiffness. While continuous fiber metal matrix composites are generally preferred for their superior mechanical properties, it is foreseeable that discontinuous fiber reinforcements could also be used. In addition, a combination of either a bimetal or polymeric composite structure which exhibits sufficient stiffness, strength and temperature capabilities could foreseeably be used instead of the preferred metal matrix composite 16, as long as compatibility existed with the particular fan blade material used.

As indicated in FIGS. 2 and 3, the metal matrix composite 16 is limited to surfaces of the fan blade 12 at its blade root 18, in that stiffness of the fan blade 12 can be most influenced at the surface of the blade root 18 with minimal additional weight. More particularly, the use of the metal matrix composite 16 is preferably limited to regions of the fan blade 12 which do not require foreign object damage (FOD) resistance to small and medium-sized birds. This limits the use of the metal matrix composite 16 to regions of the fan blade remote from the blade tip, and more specifically, to the approximate lower third of the length of the fan blade 12. The required thickness of the metal matrix composite 16 will vary with the size of the fan blade 12, but will generally be in the range of about 10 to about 25 percent of the airfoil thickness.

It is foreseeable that the use of the metal matrix composite 16 can be extended to those regions of the fan blade 12 which would result in additional resistance at the blade root 18 to foreign object damage from larger birds, if necessitated by future engine certification requirements. Such regions would include the interior regions of the fan blade 12 at the blade root 18.

From the above, it can be seen that an advantage of the present invention is that high blade counts of greater than about 26 can be attained without the need for a part span shroud or a pinned root blade, as is otherwise required by the prior art. As a result of the high blade counts, an overall weight savings can be realized for any sized engine. In addition, because the use of the metal matrix composite incurs little additional weight, high blade counts of reinforced hollow or solid titanium fan blades are able to make smaller engines more weight competitive, without the performance loss attributable to the use of a shroud. In addition, engines of less than 60 inches in diameter can also benefit from this invention, in that high blade counts of solid titanium blades are more weight competitive than hollow blades.

Also, reinforced hollow titanium fan blades are a viable alternative to composite fan blades employed on larger engines. The present invention is also cost competitive with the conventional composite blade spar shell construction of composite fan blades.

While our invention has been described in terms of a preferred embodiment, it is apparent that other forms could be adopted by one skilled in the art. Accordingly, the scope of our invention is to be limited only by the following claims.

The embodiments of the invention in which an exclusive property or privilege is claimed are defined as follows:

1. A metal alloy fan blade for a gas turbine engine, the metal alloy fan
  blade comprising:
   a blade root;
   a blade tip oppositely disposed from the blade root; and
   a reinforcing material bonded to a surface of the metal alloy fan blade at the blade root so as to be remote from the blade tip, the reinforcing material being lo provided in a quantity and thickness so as to sufficiently stiffen the metal alloy fan blade and thereby provide frequency and stability control to the fan blade;
   whereby the reinforcing material sufficiently stiffens the metal alloy fan blade so as to make unnecessary the use of a part span shroud.

2. A metal alloy fan blade as recited in claim 1 wherein the reinforcing material is a metal matrix composite material.

3. A metal alloy fan blade as recited in claim 1 wherein the reinforcing material is a titanium-silicon carbide metal matrix composite material.

4. A metal alloy fan blade as recited in claim 1 wherein the reinforcing material is excluded from regions of the fan blade which are required to be resistant to foreign object damage.

5. A metal alloy fan blade as recited in claim 1 wherein the reinforcing material is limited to the lower third of the metal alloy fan blade adjacent to the blade root.

6. A metal alloy fan blade as recited in claim 1 wherein the thickness of the reinforcing material is about 10 to about 25 percent of the thickness of the metal alloy fan blade.

7. A metal alloy fan blade as recited in claim 1 wherein the metal alloy fan blade is formed from a titanium alloy.

8. A metal alloy fan blade as recited in claim 1 wherein the metal alloy fan blade is hollow.

9. A metal alloy fan blade as recited in claim 1 wherein the reinforcing material is diffusion bonded to the metal alloy fan blade.

10. A fan blade for a gas turbine engine, the fan blade comprising:
    a fan blade member having a blade root for securing the fan blade to a hub member and a blade tip oppositely disposed from the blade root, the fan blade member being formed from a titanium alloy; and
    a metal matrix composite material bonded to a surface of the fan blade member at the blade root so as to be remote from the blade tip, the metal matrix composite material being provided in a quantity and thickness so as to sufficiently stiffen the fan blade and thereby provide frequency and stability control to the fan blade;
    whereby the metal matrix composite material sufficiently stiffens the fan blade so as to increase the fan blade's flexural frequency, thereby making unnecessary the use of a part span shroud.

11. A fan blade as recited in claim 10 wherein the metal matrix composite material is a titanium-silicon carbide metal matrix composite material.

12. A fan blade as recited in claim 10 wherein the metal matrix composite is excluded from regions of the fan blade which are required to be resistant to foreign object damage.

13. A fan blade assembly for a gas turbine engine, the fan blade assembly comprising:
    a hub member;
    a plurality of metal alloy fan blades secured to the hub member, each of the plurality of metal alloy fan blades having a blade root for securing each fan blade to the hub member and a blade tip oppositely disposed from the blade root; and
    a metal matrix composite material bonded to a surface of each fan blade at its corresponding blade root so as to be remote from its corresponding blade tip, the metal matrix composite material being provided in a quantity and thickness so as to sufficiently stiffen each fan blade and thereby provide frequency and stability control to each fan blade;

whereby the metal matrix composite material sufficiently stiffens each fan blade so as to make unnecessary the use of a part span shroud.

14. A fan blade assembly as recited in claim 13 wherein each fan blade is formed from a titanium alloy.

15. A fan blade assembly as recited in claim 13 wherein the metal matrix composite material is a titanium-silicon carbide metal matrix composite.

16. A fan blade assembly as recited in claim 13 wherein the metal matrix composite material is excluded from regions of each fan blade which are required to be resistant to foreign object damage.

17. A fan blade assembly as recited in claim 13 wherein the metal matrix composite material is diffusion bonded to the fan blades.

18. A fan blade assembly as recited in claim 13 wherein the metal matrix composite material is metallurgically compatible with titanium.

19. A fan blade assembly as recited in claim 13 wherein the fan blade assembly comprises at least twenty six of the fan blades.

* * * * *